United States Patent [19]

Hemmelgarn et al.

[11] Patent Number: 5,259,725

[45] Date of Patent: Nov. 9, 1993

[54] GAS TURBINE ENGINE AND METHOD OF ASSEMBLING SAME

[75] Inventors: Robert J. Hemmelgarn, Mason; Richard W. Albrecht, Fairfield, both of Ohio

[73] Assignee: General Electric Company, Cincinnati, Ohio

[21] Appl. No.: 963,230

[22] Filed: Oct. 19, 1992

[51] Int. Cl.⁵ .......................................... F01D 11/00
[52] U.S. Cl. .................................. 415/112; 415/115; 415/117; 415/170.1; 415/214.1; 29/888.02; 29/888.04; 29/450; 29/525.1; 403/317
[58] Field of Search ............... 415/112, 115, 116, 117, 415/170.1, 173.7, 174.4, 174.5, 220, 108, 213.1, 214.1; 29/888.02, 888.021, 450, 525.1; 403/315, 316, 317, 318, 319

[56] References Cited

U.S. PATENT DOCUMENTS

| | | |
|---|---|---|
| 1,058,936 | 4/1913 | Bancel ........................ 415/214.1 |
| 3,727,660 | 4/1973 | Burge ........................... 415/173.7 |
| 4,190,397 | 2/1980 | Schilling et al. . |
| 4,318,668 | 3/1982 | Chaplin et al. . |
| 4,662,821 | 5/1987 | Kervistin et al. ................ 415/116 |
| 4,668,163 | 5/1987 | Kervistin . |
| 4,883,407 | 11/1989 | Touze . |
| 5,090,865 | 2/1992 | Ramachandran et al. . |

Primary Examiner—Edward K. Look
Assistant Examiner—Christopher Verdier
Attorney, Agent, or Firm—Jerome C. Squillaro

[57] ABSTRACT

A gas turbine engine has a plurality of casings defining a chamber exposable to a gasflow therein, and a plurality of retaining members are associated with the housings to retain them against displacement. Each retaining member has an end portion extending into the chamber and a shield is associated with the casings to define a protective cavity within the chamber about the end portions of the retaining members thereby to isolate the end portions from the chamber. A method of assembling a gas turbine engine is also disclosed.

12 Claims, 2 Drawing Sheets

GAS TURBINE ENGINE AND METHOD OF ASSEMBLING SAME

FIELD OF THE INVENTION

This invention relates in general to gas turbine engines as may be utilized on aircraft and in particular to a gas turbine engine and a method of assembling such in which a shield is utilized for shielding preselected parts of the gas turbine engine from a gasflow.

BACKGROUND OF THE INVENTION

In at least some of the past gas turbine engines, a plurality of nut and bolt assemblies formed a generally circular bolted joint between casings of the gas turbine engine (e.g., the bolted joint between a turbine forward stator casing and a turbine aft stator casing), and the casings defined a chamber which is exposed to a gasflow (e.g., airflow and/or combustion gasses) therein when the engine is operating. Whenever the bolt heads or nuts of the aforementioned nut and bolt assemblies extended into the chamber so as to be exposed to the airflow (for example) therein, it was believed to be prudent to shield such bolt heads or nuts in order to minimize air temperature rise due to windage. This shielding was believed to be necessary especially when the airflow in the chamber was utilized as a cooling medium for other downstream components of the gas turbine engine.

At least some of the past shields for the aforementioned bolt heads or nuts at the bolted joint comprised a fully machined ring, a formed sheet metal ring, or sheet metal segments assembled into a ring, and such past shields were retained in overlaying relation with such bolt heads or nuts in the chamber by utilizing some portions of the bolts at the bolted joint. Of course, such mounting of the past shields to the bolts at the bolted joint required a plurality of cutouts or openings in such past shields in order to provide access for torquing the bolt heads or nuts. One disadvantageous or undesirable feature of the past shields is believed to be that the aforementioned cutouts therein may have created disturbances in the air flow in the chamber thereby to contribute to undesirable windage and temperature rise in such air flow. Further, another disadvantageous or undesirable feature of the past shields is believed to be that the cutouts therein may have allowed the circulation of air and abrasive dust particles within such past shields which might have caused erosion problems. Of course, when the past shields were fully machined rings, the aforementioned erosion concern may have been eliminated, but such fully machined rings are believed to be too heavy for use in the gas turbine engine and still required cutouts for access to torque the nuts or bolts at the bolted joint.

SUMMARY OF THE INVENTION

Among the several objects of the present invention may be noted the provision of an improved gas turbine engine and the provision of an improved method of assembling a gas turbine engine which overcome at least some of the disadvantageous or undesirable features of the prior art, as discussed hereinabove; the provision of such improved gas turbine engine and method in which an annular shield is associated with a plurality of casings for such engine to define a protective cavity isolating either bolt heads or nuts of a plurality of nut and bolt assemblies at a bolted joint of the casings from the chamber; the provision of such improved gas turbine engine and method in which the shield is supported in the housing independently of such nut and bolt assemblies at the bolted joint of the casings; and the provision of such improved gas turbine engine and method having component parts which are simplistic in design, easily assembled and economically manufactured. These as well as other objects and advantageous features of the present invention will be in part apparent and in part pointed out hereinafter.

In general, a gas turbine engine in one form of the invention is provided with a plurality of casings defining a chamber exposable to a gasflow therein, and a plurality of means is associated with the casings for retaining them against displacement with each retaining means having an end portion within the chamber. Shield means is mounted in engagement with the casings (or at least one of the casings) in an assembly position independently of the retaining means and defines with the casings a protective cavity within the chamber about the end portions of the retaining means for isolating the end portions from the chamber.

Further in general and in one form of the invention a method is provided for assembling a gas turbine engine. The engine includes a plurality of casings defining a chamber exposable to a swirling gasflow therein, a plurality of means for retaining the casings against displacement with each retaining means having an end portion in the chamber, a generally annular resilient shield, and a locking device. In practicing this method, the shield is engaged with the casings in the chamber, and a protective cavity is established about the end portions of the retaining means between the shield and the casings. Upon the establishment of the protective cavity, the end portions within the protective cavity are isolated from the chamber. The shield is thereafter deflected at least in part toward a deflected position, and a part of the shield is located with respect to at least one of the casings upon such deflection. Thereafter, the locking device is positioned in displacement preventing engagement between the located shield part and the at least one casing.

BRIEF DESCRIPTION OF THE DRAWINGS

Corresponding reference characters indicate corresponding parts throughout the several views of the drawings.

The exemplifications set out herein illustrate the preferred embodiment of the present invention in one form thereof, and such exemplifications are not to be construed as limiting in any manner either the scope of the disclosure or the scope of the claims set out hereinbelow.

DETAILED DESCRIPTION OF THE PREFERRED EMBODIMENTS

Figure 1:
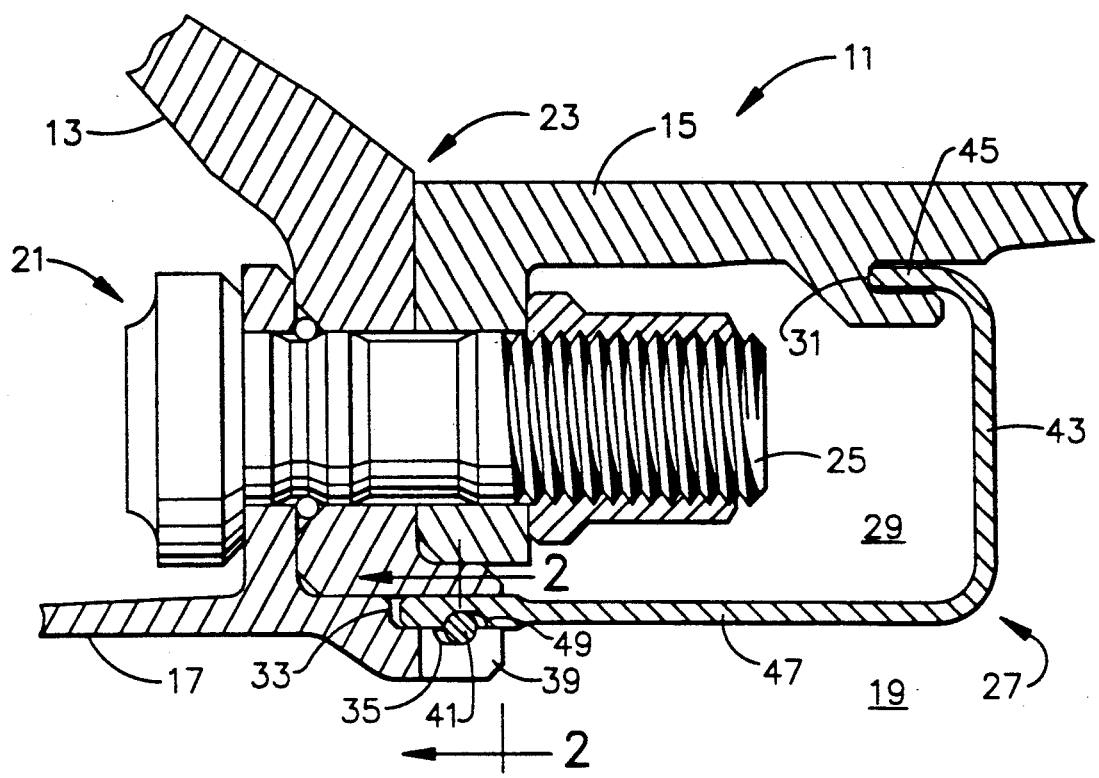
FIG. 1 is a sectional view showing a part of a gas turbine engine in one form of the invention in cross-section and illustrating principles which may be practiced in a method of assembling a gas turbine engine also in one form of the invention.

With reference now to FIG. 1, there is shown in part a gas turbine engine in one form of the invention having a plurality of generally annular casings 13,15,17 defining a chamber 19 exposable to a gasflow therein. A plurality of retaining means, such as nut and bolt assemblies 21, are associated with casings 13,15,17 so as to extend therethrough in a generally circular array forming a bolted joint 23 for retaining the casings against displacement, and each retaining means or assembly has an end portion 25 extending into chamber 19. A generally annular shield or shield means 27 is mounted in engagement with casings 13,15,17 in an assembly position independently of assemblies 21, and the shield defines with the casings a generally annular protective cavity 29 within chamber 19 about end portions 25 of assemblies 21 for isolating the assembly end portions from the airflow (for example) in the chamber. While casings 13,15,17 and shield 27 are described above as being generally annular with the casings being jointed at 23 by a circular array of assemblies 21, only a part of the casings and shield and only one of the assemblies are shown in FIG. 1 for the sake of brevity of disclosure and drawing simplification.

Figure 2:
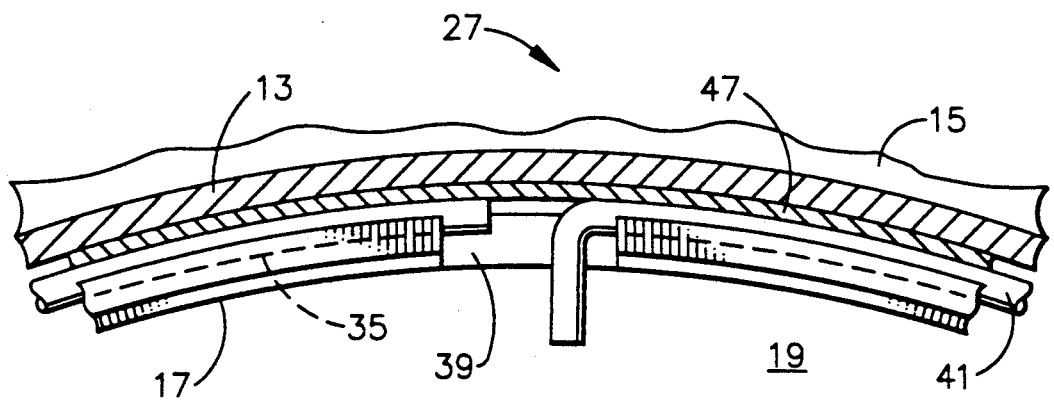
FIG. 2 is an enlarged partial sectional view taken along line 2—2 in FIG. 1.
Figure 3:
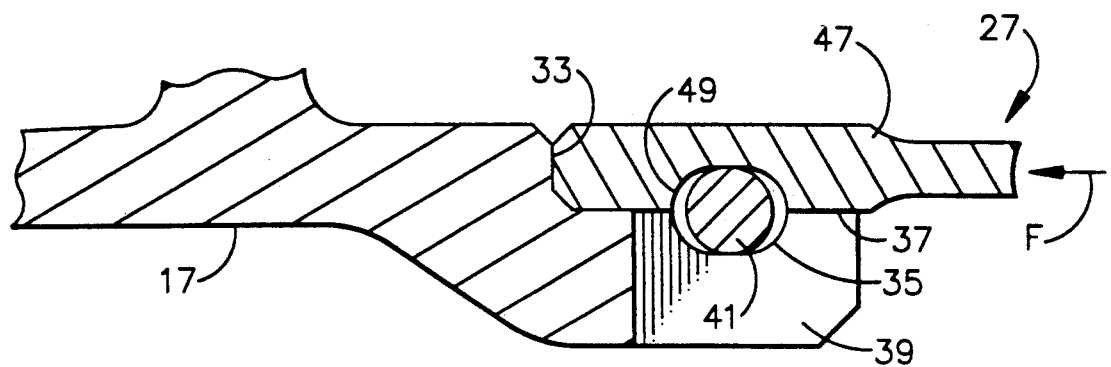
FIGS. 3 and 4 are enlarged partial sectional views taken from FIG. 1 respectively illustrating the disposition of a locking device between a casing and a shield of the gas turbine engine and the locking engagement of the locking device between the casing and the shield.
Figure 4:
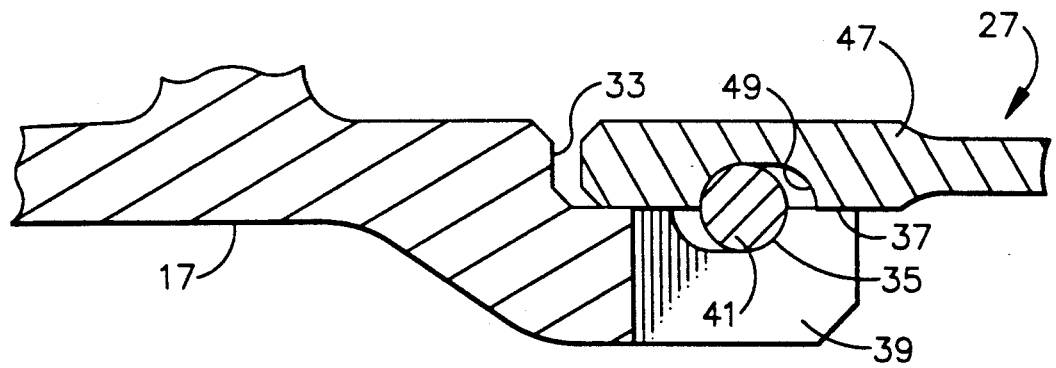

More particularly and with additional reference to FIGS. 2-4, a pair of generally annular recesses or recess means 31,33 are respectively formed in casing 15 and casings 13,17, and a generally annular groove or groove means is provided in a sidewall 37 of recess 33 defined by casing 17 To complete the description relating to casings 13,15,17 of engine 11, passage means, such as for instance an opening or slot 39 or the like, is arranged in casing 17 intersecting groove 35 for the passage thereinto of an interlocking means or locking device 41, as discussed in greater detail hereinafter.

Shield 27 is provided with a generally annular base wall 43 integrally formed between a pair of radially spaced apart, generally annular flanges or flange means 45,47 which extend generally axially from the base wall, and the shield may be formed of any resilient material having the desired physical characteristics, such as a stainless steel or the like for instance. To complete the description of shield 27, another generally annular groove or groove means 49 is provided in flange 47 generally adjacent its free end, and it may be noted that groove 49 and groove 35 in recess 33 of casings 13, 17 are disposed or arranged generally in opposed relation with each other.

To effect the assembly of shield 27 with casings 13,15,17 within chamber 19, the shield is initially engaged with the casings by respectively receiving flanges 45,47 of the shield within recesses 31,33 of the casings, and upon the insertion of the flanges into the recesses, it may be noted that the shield establishes or otherwise defines with the casings protective cavity 29 generally about end portions 25 of assemblies 21. In this manner, end portions 25 of assemblies 21 disposed within protective cavity 29 are isolated from the air in chamber 19.

Subsequent to the reception of shield flanges 45,47 within casing recesses 31,31 to establish protective cavity 29 in the manner discussed above, a force F is applied or exerted on shield 27 to resiliently deflect it at least in part toward a deflected position, as illustrated in FIG. 3. Upon the resilient deflection of shield 27 into its deflected position, shield flange 45 remains disposed in recess 31 in engagement with casing 15, and shield flange 37 is moved further into casing recess 33, i.e. until shield flange 37 bottoms out in casing recess 33, thereby to locate groove 49 in shield flange 37 with respect to groove 35 in casing recess 33. Thus, with grooves 35,49 so located with respect to each other, it may be noted that the grooves are generally radially aligned with each other and disposed generally in opposed relation with each other.

Upon the alignment of grooves 35, 49 in their opposed relation, as previously discussed, locking device 41 is positioned within the grooves for displacement preventing engagement between shield flange 47 and casing 17. Locking device 41 comprises a generally annular lock wire which is end-wise inserted or fed through slot 39 in casing 17 into the aligned grooves 35,49 so as to extend generally completely about the aligned grooves thereby to be positioned for the aforementioned displacement preventing engagement, between shield flange 47 and casing 27, as best seen in FIG. 2.

When lock wire 41 is so received within aligned grooves 35, 49 in their opposed relation, the force F is removed from shield 27, and due to the aforementioned resilient characteristic of the shield, the shield resiles or springs back from its deflected position into an assembly position, as illustrated in FIG. 4. In response to the resiling of shield 27 to its assembly position, at least shield flange 47 is resiled or moved in casing recess 33 so as to releasably engage lock wire 41 between at least a part of each groove 35,49 thereby to releasably retain the shield against displacement from its assembly position with respect to casings 13,15,17 within chamber 19. Of course, when shield 27 is disposed in its assembly position, it may be noted that the shield is not only mounted independently of assemblies 21 so as to define protective cavity 29 about end portions 25 of the assemblies for isolating the end portions from the gasflow in chamber 19 but also presents smooth surfaces to the gasflow in the chamber thereby to at least minimize windage and temperature rise related thereto with respect to the gasflow.

To complete the description of engine 11 and its method of assembly, it is contemplated that various retaining means, other than assemblies 21, may be utilized to retain casings 13,15,17 against displacement and that the bolt heads of the assemblies, rather than the nut ends thereof, may be disposed within protective cavity 29 within the scope of the invention so as to meet at least some of the objects thereof. It is understood that the casings 3, 15, 17 could be associated with various portions of the engine. For example, and without limitation, in some designs the casings could be compressor (or booster) casings, while in other designs the casings could be turbine casings. It is further understood that with only slight modifications to the design of the joint, the invention can be practiced in the absence of casing 13 and the invention can be practiced with the shield means mounted in engagement with only casing 15.

From the foregoing, it is now apparent that a novel gas turbine engine 11 and a novel method of assembling such have been presented, and it is contemplated that changes as to the precise arrangements, configurations and details of the components utilized in such engine and method, as well as the precise order of the method steps of such method, may be made by those having ordinary skill in the art without departing from the spirit of the present invention or the scope thereof as defined by the claims which follow.

We claim:

1. A gas turbine engine joint arrangement comprising:
   a plurality of casings defining a chamber exposable to a gasflow therein;
   a plurality of means associated with said casings for retaining them against displacement, said retaining means each having an end portion within said chamber; and
   shield means mounted in engagement with at least one of said casings in an assembly position independently of said retaining means and defining with said at least one casing a protective cavity within said chamber about said end portions of said retaining means for isolating said end portions from said chamber.

2. A gas turbine engine joint arrangement comprising:
   a plurality of casings defining a chamber exposable to a gasflow therein;
   a plurality of means associated with said casings for retaining them against displacement, said retaining means each having an end portion within said chamber; and
   shield means mounted in engagement with said casings in an assembly position independently of said retaining means and defining with said casings a protective cavity within said chamber about said end portions of said retaining means for isolating said end portions from said chamber.

3. The gas turbine engine as set forth in claim 2 further comprising interlocking means releasably engaged between one of said casings and a part of said shield means for releasably retaining said shield means against displacement from its assembly position.

4. The gas turbine engine as set forth in claim 3 wherein said one casing and said shield means part each include groove means arranged at least in part in opposed relation for receiving said interlocking means.

5. The gas turbine engine as set forth in claim 4 wherein said one casing includes means intersecting said groove means in said one casing for passage of said interlocking means into said groove means when said groove means are arranged at least in part in opposed relation.

6. The gas turbine engine as set forth in claim 5 further comprising a pair of recess means in at least said one casing and another of said casings for respectively receiving a pair of parts of said shield means, a pair of groove means in one of said recess means and one of said shield means parts and disposed at least in part in opposed relation for receiving said interlocking means, respectively.

7. A gas turbine engine joint arrangement comprising:
   a plurality of casings defining a chamber exposable to a gasflow therein;
   a plurality of means associated with said casings for retaining them against displacement, said retaining means each having a portion within said chamber;
   a pair of generally annular recesses in said casings and respectively radially spaced adjacent said retaining means portions;
   a generally annular groove within one of said recesses;
   shield means disposed in an assembly position in said chamber and defining a protective cavity in said chamber about said retaining means portions for isolating said retaining means portions from said chamber, said shield means including a generally annular base wall spaced adjacent said retaining means portions, a pair of generally annular flange means integral with said base walls for reception in said recesses, respectively, and another annular groove in one of said flange means and arranged at least in part in opposed overlaying relation with said first named annular groove; and
   means disposed in interlocking engagement with said first named groove and another groove for releasably retaining said shield means against displacement from its assembly position.

8. A method of assembling a gas turbine engine, the engine including a plurality of casings defining a chamber exposable to a gasflow therein, a plurality of means for retaining the casings against displacement with each retaining means having an end portion in the chamber, a generally annular resilient shield, and a locking device, the method comprising the steps of:
   engaging the shield with the casings in the chamber and establishing a protective cavity generally about the end portions of the retaining means between the shield and the casings;
   isolating the end portions within the protective cavity from the chamber in response to the establishing step;
   deflecting the shield at least in part toward a deflected position and locating a part of the shield with respect to at least one of the casings in response to the deflecting step; and
   positioning the locking device in displacement preventing engagement between the shield part and the at least one casing upon the occurrence of the locating step.

9. The method as set forth in claim 8 further comprising the additional step of resiling the shield at least in part from its deflected position to insure the displacement preventing engagement of the locking device between the shield part and the at least one casing.

10. The method as set forth in claim 8 wherein the casings include a pair of generally annular recesses and the shield includes a pair of generally annular flanges with one of the flanges comprising the shield part, and wherein the arranging step includes receiving the flanges in the recesses, respectively.

11. The method as set forth in claim 10 wherein the one flange and one of the recesses respectively include a pair of generally annular grooves disposed in opposed relation, and wherein the locating step includes aligning the grooves in their opposed relation.

12. The method as set forth in claim 11 wherein the locking device comprises a lock wire, and wherein the positioning step includes inserting the lock wire endwise thereof into the aligned grooves in their opposed relation upon the occurrence of the aligning step.

* * * * *